Feb. 26, 1924.
J. PERRET
1,485,287
COMMUTATION OF DIRECT CURRENT MACHINES
Filed Nov. 23, 1921
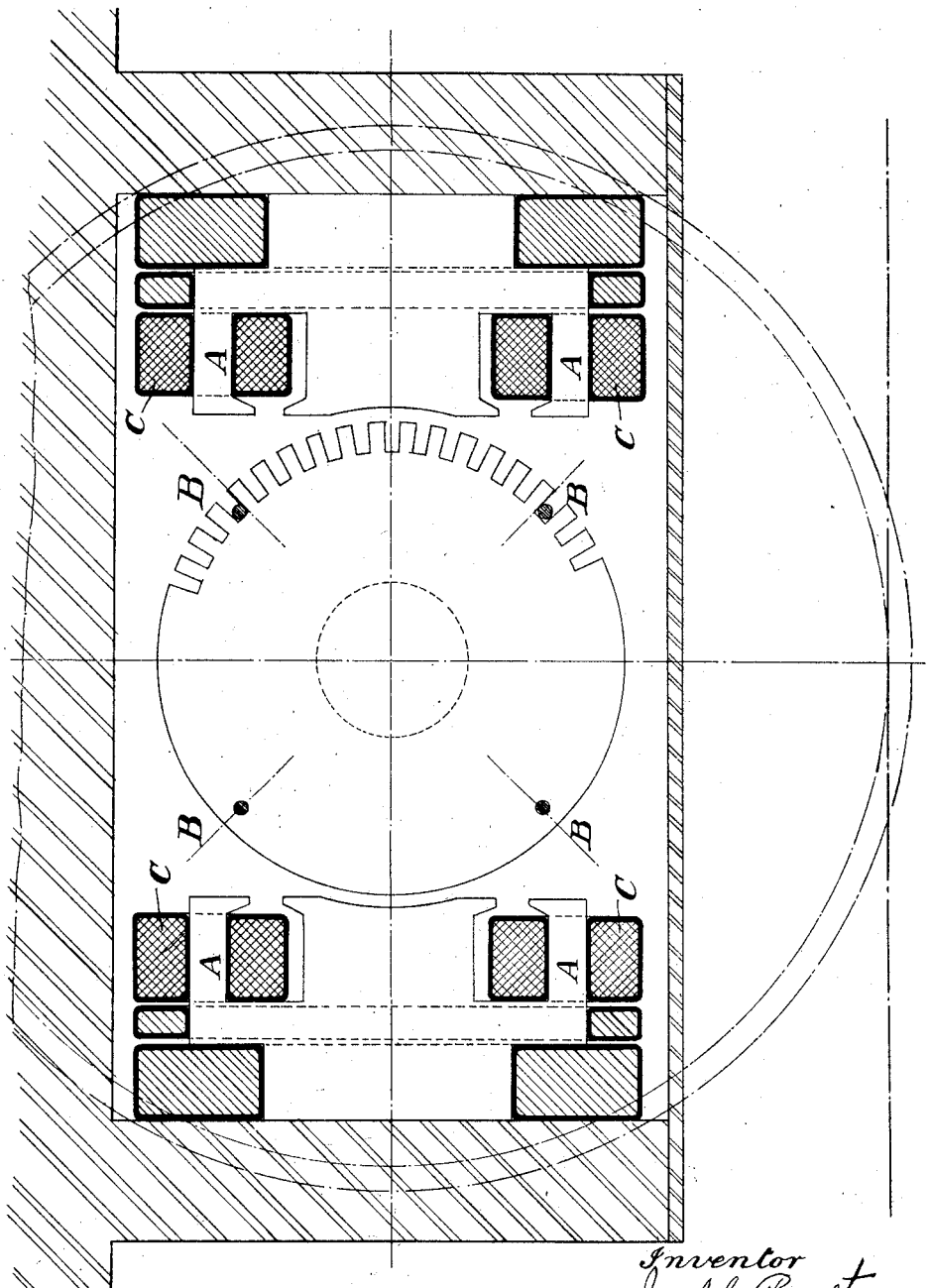

Patented Feb. 26, 1924.

1,485,287

UNITED STATES PATENT OFFICE.

JOSEPH PERRET, OF PARIS, FRANCE, ASSIGNOR TO FORGES ET ATELIERS DE CONSTRUCTIONS ELECTRIQUES DE JEUMONT, OF PARIS, FRANCE.

COMMUTATION OF DIRECT-CURRENT MACHINES.

Application filed November 23, 1921. Serial No. 517,319.

*To all whom it may concern:*

Be it known that I, JOSEPH PERRET, a citizen of the Republic of France, residing at Paris, France, have invented certain new and useful Improvements in the Commutation of Direct-Current Machines, of which the following is a specification.

This invention relates to improvements in the commutation of direct current machines and more particularly to those machines mounted directly on the axle of a high speed locomotive.

Auxiliary poles are now generally employed in direct current machines; in some cases however, this application in its ordinary form does not appear capable of being employed or has disadvantages. This is the case in the bi-polar traction motor mounted directly on the axle which is found in certain high speed locomotives.

In arrangements hitherto employed in this type of machine commutating poles have not been adaptable; in fact efforts have been made to obtain for a given diameter of the driving wheel the greatest possible diameter of the armature thus excluding auxiliary poles.

The invention hereinafter described allows of the application of auxiliary poles of this type of machine without in any way sacrificing the power thereof, but on the contrary with the result of improving its working and maintenance.

According to this invention, the armature of the machine is wound with a greatly reduced pitch to form four zones of commutation, two for each of the turns undergoing commutation under each brush; for example if the pitch of each turn is 90° four zones of commutation are obtained distributed at 90° relatively to one another. A further object of the invention is to form commutating poles constructed to act in combination with the main poles and to interact with each zone of commutation without any increase in the height of the machine.

Referring to the accompanying drawing which shows the arrangement of the present invention under the conditions which have just been mentioned, it will be seen that by the arrangement stated four commutating poles such as A are provided which act on each of the four zones B. The flux of the commutating poles is created by current passing through the coils C.

The invention is further characterized by the circumstance that the magnetic circuit of the commutating poles is combined with that of the principal poles.

I declare that what I claim is:—

1. In a bi-polar direct current machine adapted to be mounted directly on a vehicle axle the combination of an armature, a bi-polar field structure of substantially the same internal height as the diameter of said armature, and a plurality of commutating poles mounted on said field structure to form commutating zones.

2. In a bi-polar direct current machine adapted to be mounted directly on a vehicle axle, the combination of an armature, a bi-polar field structure of substantially the same internal height as the diameter of said armature, and a plurality of commutating poles mounted on said field structure to form equally spaced commutating zones.

3. In a bi-polar direct current machine adapted to be mounted directly on a vehicle axle, the combination of an armature, a bi-polar field structure of substantially the same internal height as the diameter of said armature, and a plurality of commutating poles mounted on said field structure to form commutating zones and lying substantially within the horizontal tangential planes of said armature.

4. In a bi-polar direct current machine adapted to be mounted directly on a vehicle axle, the combination of an armature wound with a shortened pitch to form four commutating zones, a bi-polar field structure of substantially the same internal height as the diameter of said armature and four commutating poles forming part of said field structure and mounted to interact with said commutating zones.

5. In a bi-polar direct current machine adapted to be mounted directly on a vehicle axle, the combination of an armature wound with a shortened pitch to form four commutating zones, a bi-polar field structure of substantially the same internal height as the diameter of said armature, and four commutating poles mounted one on each side of the main poles of said field structure to interact with said commutating zones.

6. In a bi-polar direct current machine adapted to be mounted directly on a vehicle axle, the combination of an armature wound with a shortened pitch to form four commutating zones, a bi-polar field structure of substantially the same internal height as the diameter of said armature, four commutating poles mounted one on each side of the main poles of said field structure and adapted to interact two with each of said main poles to form four commutating zones.

In witness whereof, I have hereunto signed my name.

JOSEPH PERRET.

Witnesses:
ALPHONSE NÉJEAY,
J. T. McGUTH.